(12) United States Patent
Li et al.

(10) Patent No.: US 12,148,900 B2
(45) Date of Patent: Nov. 19, 2024

(54) SAMPLING COMPONENT, BATTERY MODULE, BATTERY PACK, AND DEVICE

(71) Applicant: CONTEMPORARY AMPEREX TECHNOLOGY (HONG KONG) LIMITED, Hong Kong (CN)

(72) Inventors: Long Li, Ningde (CN); Hua Cao, Ningde (CN); Zhenxing Chen, Ningde (CN); Mu Qian, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 485 days.

(21) Appl. No.: 17/614,368

(22) PCT Filed: Sep. 29, 2020

(86) PCT No.: PCT/CN2020/119086
§ 371 (c)(1),
(2) Date: Nov. 25, 2021

(87) PCT Pub. No.: WO2021/135475
PCT Pub. Date: Jul. 8, 2021

(65) Prior Publication Data
US 2022/0223930 A1     Jul. 14, 2022

(30) Foreign Application Priority Data
Dec. 31, 2019 (CN) .......................... 201922495201.4

(51) Int. Cl.
*H01M 10/48* (2006.01)
*H01M 50/569* (2021.01)
*H01R 13/00* (2006.01)

(52) U.S. Cl.
CPC ....... *H01M 10/486* (2013.01); *H01M 50/569* (2021.01); *H01M 2220/20* (2013.01); *H01R 13/00* (2013.01)

(58) Field of Classification Search
CPC .................................................... H01M 50/569
See application file for complete search history.

(56) References Cited

U.S. PATENT DOCUMENTS

| | | | |
|---|---|---|---|
| 2012/0148876 A1* | 6/2012 | Zeng ................. | H01M 10/4257 429/7 |
| 2015/0064524 A1* | 3/2015 | Noh ..................... | H01R 11/288 429/90 |

(Continued)

FOREIGN PATENT DOCUMENTS

| | | |
|---|---|---|
| CN | 205609644 U | 9/2016 |
| CN | 107403889 A | 11/2017 |

(Continued)

OTHER PUBLICATIONS

Machine Translation of WO-2018155093-A1 (May 21, 2024) (Year: 2024).*

(Continued)

*Primary Examiner* — Matthew J Merkling
(74) *Attorney, Agent, or Firm* — Kilpatrick Townsend & Stockton LLP

(57) ABSTRACT

This application relates to a sampling component, a battery module, a battery pack, and a device. The sampling component includes: a circuit board, including a signal collecting portion and an insulation film connected to the signal collecting portion; and a connecting part, including a body portion and a connecting portion, where the body portion is connected to the connecting portion, and the connecting portion is electrically connected to the signal collecting portion. In a height direction, the connecting portion includes a first connecting section and a second connecting (Continued)

section. The first connecting section is connected to the second connecting section. In the height direction, at least a part of the signal collecting portion is located between the first connecting section and the second connecting section.

21 Claims, 6 Drawing Sheets

(56) References Cited

U.S. PATENT DOCUMENTS

| | | | |
|---|---|---|---|
| 2018/0351143 A1* | 12/2018 | Nakayama | H01M 10/0413 |
| 2019/0386349 A1* | 12/2019 | Zeng | H01M 50/519 |
| 2021/0050568 A1* | 2/2021 | Yang | H01M 10/643 |
| 2021/0203012 A1* | 7/2021 | Chen | H01M 50/569 |

FOREIGN PATENT DOCUMENTS

| | | | |
|---|---|---|---|
| CN | 107801303 A | 3/2018 | |
| CN | 207156976 U | 3/2018 | |
| CN | 207426196 U | 5/2018 | |
| CN | 207459047 U | 6/2018 | |
| CN | 109004167 A | 12/2018 | |
| CN | 109638209 A | 4/2019 | |
| CN | 209730082 U | 12/2019 | |
| CN | 211320199 U | 8/2020 | |
| JP | 2003077568 A | 3/2003 | |
| JP | 2017084492 A | 5/2017 | |
| WO | 2014125642 A1 | 8/2014 | |
| WO | WO-2018155093 A1 * | 8/2018 | H01M 10/48 |

OTHER PUBLICATIONS

Machine Translation of CN207426196U (May 21, 2024) (Year: 2024).*
Notice of Reasons for Refusal received in the corresponding Japanese Application 2022-534362, mailed Jul. 12, 2023.
Contemporary Amperex Technology Co., Limited, International Search Report, PCT/CN2020/119086, Dec. 30, 2020, 8 pgs.
Written Opinion received in the corresponding International Application PCT/CN2020/119086, mailed Dec. 30, 2020.
Notice of Granting Priority Right of Utility Model Patent Right received in the corresponding Chinese Application 201922495201.4, mailed Jun. 16, 2020.
The first office action received in the corresponding European Application 20908476.3, mailed Aug. 23, 2022.
The extended European search report received in the corresponding European Application 20908476.3, mailed May 9, 2022.

* cited by examiner

SAMPLING COMPONENT, BATTERY MODULE, BATTERY PACK, AND DEVICE

CROSS REFERENCE TO RELATED APPLICATIONS

This application is a United States National Stage Application filed under 35 U.S.C. § 371 of PCT Patent Application Ser. No. PCT/CN2020/119086, filed Sep. 29, 2020, which claims priority to Chinese Patent Application No. 201922495201.4, filed with the National Intellectual Property Administration, PRC on Dec. 31, 2019 and entitled "SAMPLING COMPONENT, BATTERY MODULE, BATTERY PACK, AND DEVICE," each of which is incorporated herein by reference in its entirety.

TECHNICAL FIELD

This application relates to the technical field of energy storage devices, and in particular, to a sampling component, a battery module, a battery pack, and a device.

BACKGROUND

The battery module includes battery cells. Electrode leads of adjacent battery cells are connected by a connecting plate. The battery cells generate heat during operation. Accumulation of heat increases a temperature of the battery module. To keep high efficiency of the battery module, the temperature of the battery module needs to be controlled to be within a normal operating temperature range as far as possible. The battery module obtains the temperature of the battery cells during operation by collecting voltage of the connecting plate by means of flexible printed circuit (FPC). In the related art, the FPC is connected to the connecting plate by welding. However, due to a relatively high temperature during the welding, a risk of damaging an electronic device in the FPC exists, thereby affecting measurement precision and reliability of the FPC.

SUMMARY

This application provides a sampling component, a battery module, a battery pack, and a device. The sampling component achieves a relatively high precision and reliability of collection performed on a battery cell.

A first aspect of embodiments of this application provides a sampling pack. The sampling pack includes:
  a circuit board, where the circuit board includes a signal collecting portion and an insulation film connected to the signal collecting portion; and
  a connecting part, where the connecting part includes a body portion and a connecting portion, the body portion is connected to the connecting portion, and the connecting portion is electrically connected to the signal collecting portion,
  where, in a height direction, the connecting portion includes a first connecting section and a second connecting section, and the first connecting section is connected to the second connecting section; and
  in the height direction, at least a part of the signal collecting portion is located between the first connecting section and the second connecting section.

In some embodiments, a second through-hole is opened on the signal collecting part. The first connecting section passes through the second through-hole, so that at least a part of the signal collecting part is located between the first connecting section and the second connecting section.

In some embodiments, a first through-hole is opened on the insulation film. At least a part of the connecting portion passes through the first through-hole and is connected to the signal collecting portion.

In some embodiments, the first connecting section includes a plurality of tips. In a direction toward the circuit board, a cross-sectional area of each of the plurality of tips gradually decreases.

Each of the plurality of tips is able to pierce the insulation film, and is bendable against the second connecting section, so that at least a part of the signal collecting portion is located between the first connecting section and the second connecting section.

In some embodiments, the connecting part further includes a buffer portion. The buffer portion is connected to the connecting portion and the body portion.

The buffer portion includes a plurality of bend structures, and each of the plurality of bend structures protrudes in the height direction.

In some embodiments, a gap exists between adjacent bend structures.

In some embodiments, the connecting part further includes a transition portion. The body portion is connected to the buffer portion. The transition portion is connected between the buffer portion and the connecting portion.

In some embodiments, a reinforcing structure is disposed on the transition portion, and the reinforcing structure is arc-shaped.

In some embodiments, a material of the connecting part includes a copper-nickel alloy.

A second aspect of embodiments of this application provides a battery module. The battery module includes:
  a battery cell, where the battery cell includes an electrode lead;
  a connecting plate, where the connecting plate is connected to the electrode lead of the battery cell; and
  a sampling component, where the sampling component is the sampling component described above,
  where, the sampling component is connected to the connecting plate by a connecting part.

In some embodiments, a limiting structure is disposed on the body portion.

A limiting hole is opened on the connecting plate, and the limiting structure fits with the limiting hole.

A third aspect of embodiments of this application provides a battery pack. The battery pack includes:
  a box body, where the box body includes an accommodation cavity; and
  a battery module, where the battery module is the battery module described above,
  where, the battery module is accommodated in the accommodation cavity.

A fourth aspect of embodiments of this application provides a device. The device uses a battery cell as a power supply. The device includes:
  a power source, where the power source is configured to provide a driving force to the device; and
  the battery module described above, which is configured to provide electrical energy to the power source, or the battery pack described above, which is configured to provide electrical energy to the power source.

In the embodiments of this application, the circuit board of the sampling component is electrically connected to the connecting plate by the connecting part, and mechanically connected by the connecting part. That is, the circuit board does not need to be directly welded to the connecting plate, thereby reducing risks of damage to an electronic device in the circuit board caused by a too high welding temperature, and improving precision and reliability of collection performed by the circuit board on an electrode lead of the battery cell. In addition, without the need of welding between the circuit board and the connecting plate, requirements of high-temperature resistance performance on the insulation film are lowered. That is, the insulation film may be made of a material with relatively low performance of high-temperature resistance, thereby reducing the cost of the insulation film.

Understandably, the above general description and the following detailed description are merely exemplary without limiting this application.

BRIEF DESCRIPTION OF DRAWINGS

To describe the technical solutions in the embodiments of this application more clearly, the following outlines the drawings to be used in the description of the embodiments of this application. Apparently, the drawings outlined below are merely some embodiments of this application, and a person of ordinary skill in the art may derive other drawings from the outlined drawings without making any creative efforts.

REFERENCE NUMERALS

Figure 1:
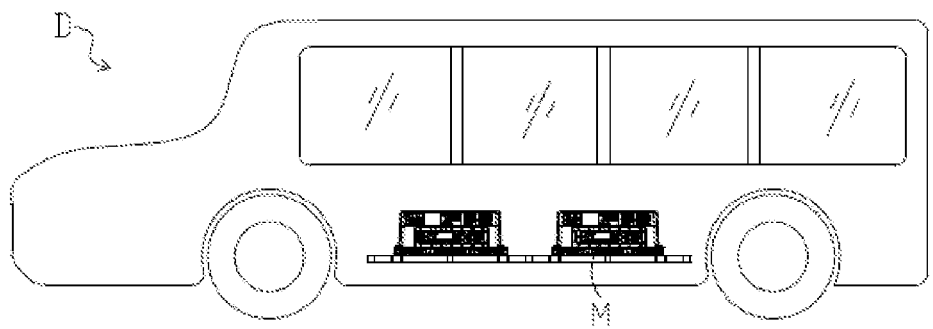
FIG. 1 is a schematic structural diagram of a device according to a specific embodiment of this application.

D—Device;
M—Battery pack;
M1—Box body;
 M11—Upper box;
 M12—Lower box;
 M13—Accommodation cavity;
M2—Battery module;

1—Sampling component;
 11—Circuit board;
  111—Insulation film;
   111a—First insulation film;
   111b—Second insulation film;
   111c—First through-hole;
  112—Signal collecting portion;
   112a—Sampling wire;
   112b—Conductive plate;
   112c—Second through-hole;
 12—Connecting part;
  121—Body portion;
   121a—Limiting structure;
  122: Connecting portion;
   122a—First connecting section;
   122b—Second connecting section;
   122c—Guide trough;
   122d—Accommodation cavity;
   122e—Tip;
  123—Buffer portion;
   123a—Bend structure;
   123b—Gap;
  124—Transition portion;
   124a—Reinforcing structure;
2—Connecting plate;
 21—Limiting hole;
3—End plate;
4—Side plate;
5—Battery cell; and
 51—Electrode lead.

The drawings described here are incorporated into the specification as a part of the specification. The drawings illustrate embodiments of this application and are used together with the specification to interpret the principles of this application.

DETAILED DESCRIPTION OF EMBODIMENTS

For better understanding of the technical solutions of this application, the following describes embodiments of this application in detail with reference to accompanying drawings.

Apparently, the embodiments described herein are merely a part of the embodiments of this application rather than an entirety of the embodiments. All other embodiments derived by a person of ordinary skill in the art based on the embodiments of this application without making any creative efforts shall fall within the protection scope of this application.

The terms used in the embodiments of this application are intended only for describing specific embodiments rather than for limiting this application. Unless otherwise expressly indicated in the context, the words "a", "the", and "this" that precede a singular noun in the embodiments and claims of this application are intended to include the plural form thereof.

Understandably, the term "and/or" used herein merely describes an association relationship between associated objects and indicates existence of three relationships. For example, "A and/or B" may indicate existence of A alone, coexistence of A and B, and existence of B alone. In addition, the character "/" herein generally indicates an "or" relationship between the object preceding the character and the object following the character.

It needs to be noted that directional terms such as "on", "above", "under", "below", "left", and "right" used in the embodiments of this application are described from a perspective shown in the accompanying drawings, and shall not be understood as a limitation on the embodiments of this application. In addition, understandably, depending on the context, one element described as being connected "on" or "under" another element not only means that the element may be directly connected "on" or "under" the other element, but also means that the element may be indirectly connected "on" or "under" the other element through an intermediate element.

An embodiment of this application provides a device D that uses a battery cell 5 as a power supply, a battery pack M, and a battery module M2. The device D that uses a battery cell 5 as a power supply may be a mobile device such as a vehicle, a ship, or a small aircraft. The device D contains a power source, and the power source is configured to provide a driving force for the device D. The power source may be configured as a battery module M2 (or a battery pack M) that provides electrical energy to the device D. The driving force of the device D may be sole electrical energy, or may include electrical energy and other types of energy (such as mechanical energy). The power source may be a battery module M2 (or a battery pack M), or may be a combination of a battery module M2 (or a battery pack M) and an engine, or the like. Therefore, all devices D that can use a battery cell 5 as a power supply fall within the protection scope of this application.

As shown in FIG. 1, using a vehicle as an example, an apparatus D in an embodiment of this application may be a new energy vehicle. The new energy vehicle may be a battery electric vehicle, or may be a hybrid electric vehicle or a range-extended electric vehicle or the like. The vehicle may include a battery pack M and a vehicle body. The battery pack M is disposed in the vehicle body. A driving motor is further disposed in the vehicle body, and the driving motor is electrically connected to the battery pack M. The battery pack M provides electrical energy. The driving motor is connected to wheels of the vehicle body through a transmission mechanism to drive the vehicle to run. Specifically, the battery pack M may be horizontally disposed at a bottom of the vehicle body.

Figure 2:
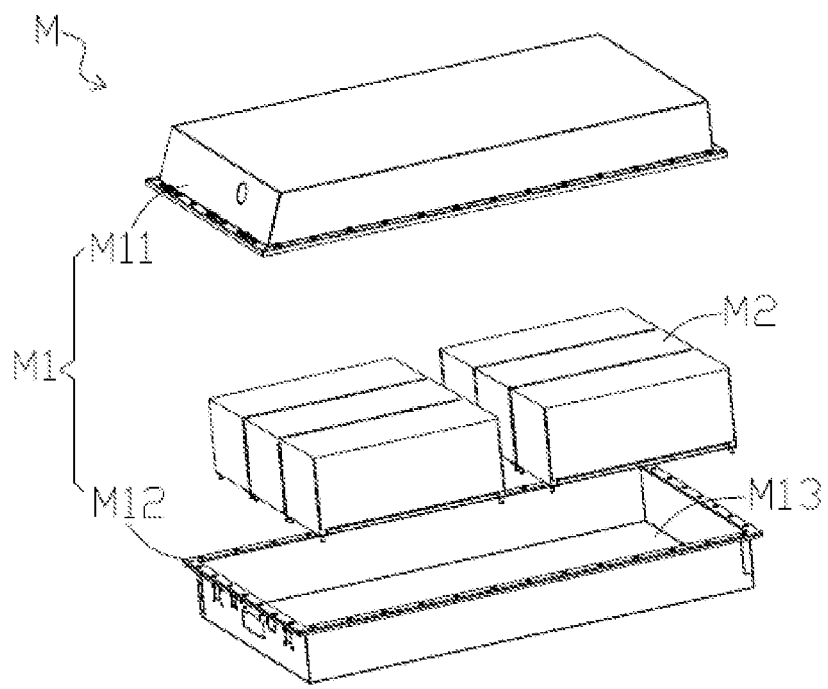
FIG. 2 is an exploded view of a battery pack shown in FIG. 1 according to a specific embodiment.

As shown in FIG. 2, the battery pack M includes a box body M1 and a battery module M2 that is disclosed in this application. The box body M1 has an accommodation cavity M13. The battery module M2 is accommodated in the accommodation cavity M13. The battery module M2 may be one or more in number. A plurality of battery modules M2 are arranged in the accommodation cavity M13. The box body M1 is not limited in terms of type, and may be a frame shape, a disk shape, or a box shape. Specifically, as shown in FIG. 2, the box body M1 may include a lower box M12 accommodating the battery module M2 and an upper box M11 snap-fitted with the lower box M12.

Figure 3:
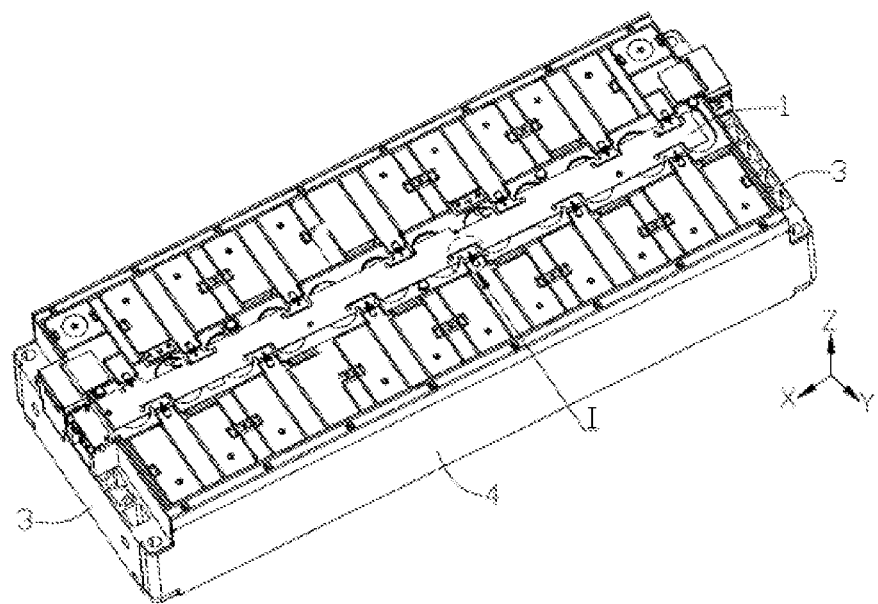
FIG. 3 is a schematic structural diagram of a battery module shown in FIG. 2 according to a specific embodiment.

More specifically, as shown in FIG. 3, the battery module M2 includes a plurality of battery cells 5 and a frame structure configured to fix the battery cells 5. The plurality of battery cells 5 are stacked along a length direction X. The frame structure includes end plates 3. The end plates 3 are respectively located at two ends of the stacked battery cells 5 along the length direction X, and are configured to limit movement of the battery cells 5 along the length direction X. In addition, in a specific embodiment, the frame structure may further include side plates 4. The two side plates 4 are respectively located on two sides of the stacked battery cells 5 along a width direction Y, and the side plates 4 are connected to the end plates 3 to form the frame structure.

Specifically, the battery cells 5 include electrode leads 51. Each battery cell 5 includes a positive electrode lead and a negative electrode lead. In the battery module, the plurality of battery cells 5 are electrically connected to each other, and specifically, may be connected in series, in parallel or in both series and parallel or the like. The electrode leads 51 of different battery cells are connected by a connecting plate 2. For example, when the battery cells 5 are connected in series, a positive electrode lead of a battery cell 5 is connected to a negative electrode lead of an adjacent battery cell 5 by the connecting plate 2.

Figure 4:
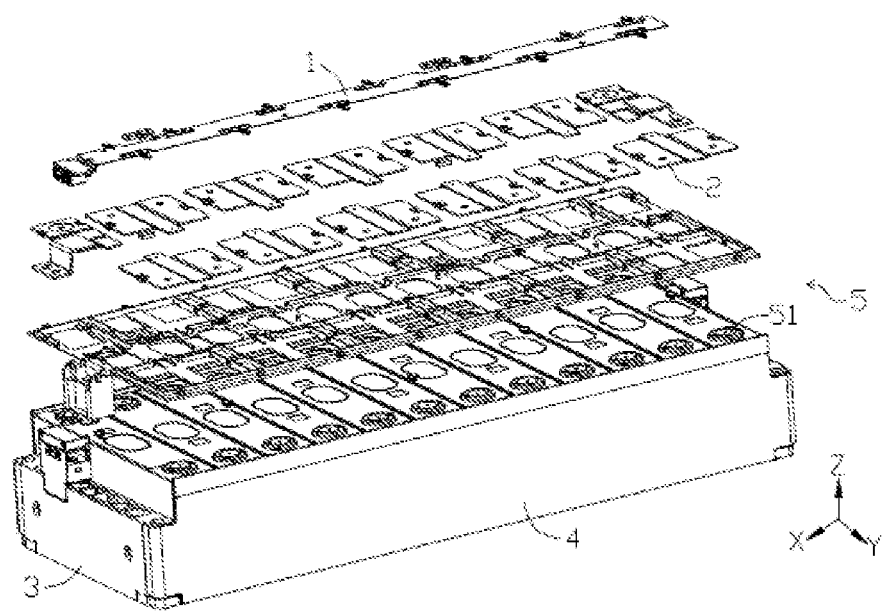
FIG. 4 is an exploded view of FIG. 3.

In addition, as shown in FIG. 3 and FIG. 4, the battery module M2 further includes a sampling component 1. The sampling component 1 is configured to collect signals such as temperature and voltage during operation of the battery cell 5. The collected signals are output through a connector. The sampling component 1 is electrically connected to the connecting plate 2 so that information about the battery cell 5 can be collected through the connecting plate 2.

Figure 5:
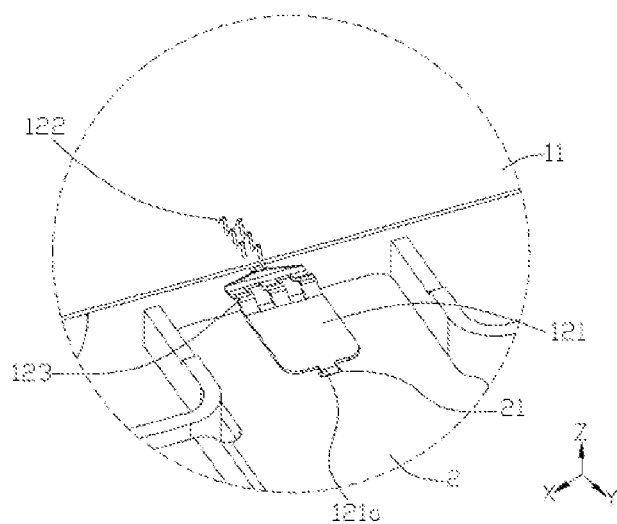
FIG. 5 is a local detailed view of part I shown in FIG. 3, where the first connecting section is in an initial state.
Figure 6:
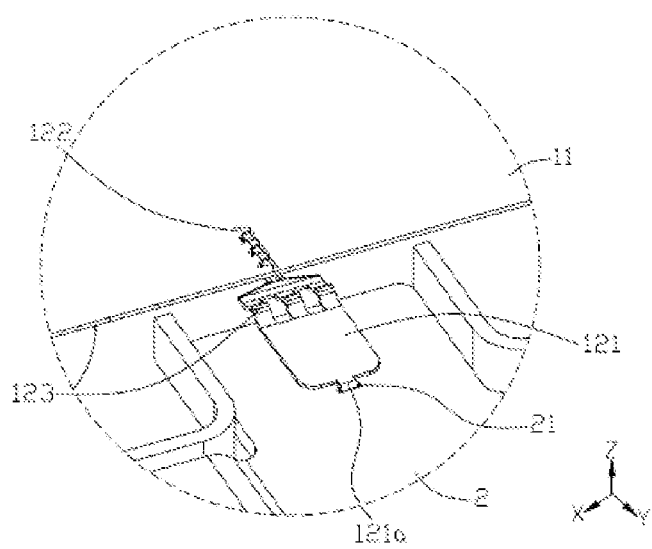
FIG. 6 is a local detailed view of part I shown in FIG. 3, where the first connecting section is in a connected state.
Figure 7:
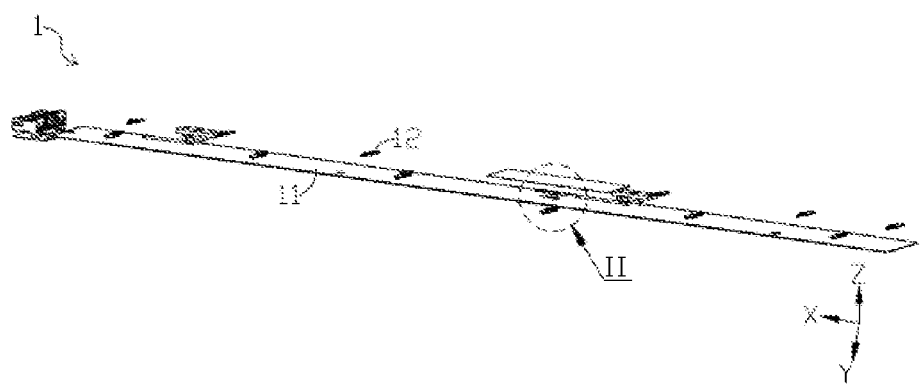
FIG. 7 is a local exploded view of a sampling component shown in FIG. 4.

Specifically, as shown in FIG. 5, the sampling component 1 includes a circuit board 11 and a connecting part 12. The circuit board 11 includes a signal collecting portion 112 and an insulation film 111 connected to the signal collecting portion 112. The signal collecting portion 112 is configured to collect the information about the battery cell 5. The insulation film 111 provides insulation protection for the signal collecting portion 112. As shown in FIG. 5 and FIG. 6, the connecting part 12 connects the circuit board 11 and the connecting plate 2. In this way, the electrode lead 51 of the battery cell 5 is connected to the circuit board 11 by the connecting part 12 and the connecting plate 2 to implement the collection of the information about the battery cell 5.

Figure 10:
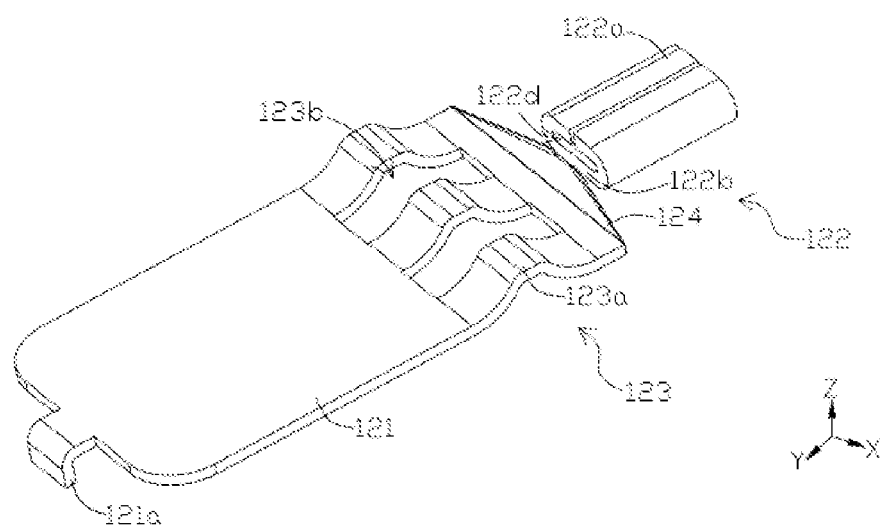
FIG. 10 is a schematic structural diagram of a connecting part provided in this application according to a first specific embodiment.

As shown in FIG. 5, FIG. 6, and FIG. 10, the connecting part 12 includes a body portion 121 and a connecting portion 122. The body portion 121 is connected to the connecting portion 122. The connecting part 12 is electrically connected to the signal collecting portion 112. In a height direction Z, the connecting portion 122 includes a first connecting section 122a and a second connecting section 122b. The first connecting section 122a is connected to the second connecting section 122b. In the height direction Z, at least a part of the signal collecting portion 112 is located between the first connecting section 122a and the second connecting section 122b.

In this embodiment of this application, the circuit board 11 of the sampling component 1 is electrically connected to the connecting plate 2 by the connecting part 12, and mechanically connected by the connecting part 12. That is, the circuit board 11 does not need to be directly welded to the connecting plate 2, thereby reducing risks of damage to an electronic device in the circuit board 11 caused by a too high welding temperature, and improving precision and reliability of collection performed by the circuit board 11 on the electrode lead 51 of the battery cell 5. In addition, without the need of welding between the circuit board 11 and the connecting plate 2, requirements of high-temperature resistance performance on the insulation film 111 are lowered. That is, the insulation film 111 may be made of a material with relatively low performance of high-temperature resistance, thereby reducing the cost of the insulation film 111.

When the circuit board 11 is connected to the connecting part 12, in the height direction Z, at least a part of the signal collecting portion 112 is located between the first connecting section 122a and the second connecting section 122b of the connecting portion 122, so as to connect to the signal collecting portion 112 through the first connecting section 122a and the second connecting section 122b, and to electrically connect to the signal collecting portion 112.

Figure 9:
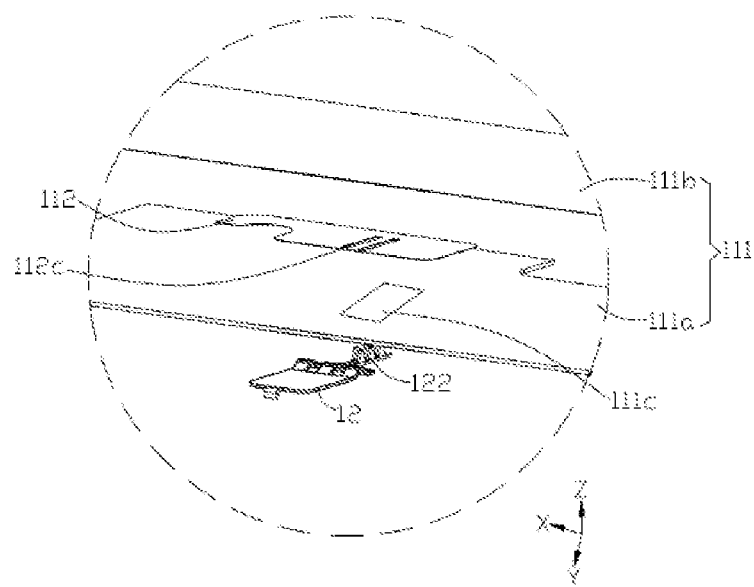
FIG. 9 is a local detailed view of part II shown in FIG. 7, where a signal collecting portion is based on a second embodiment.
Figure 11:
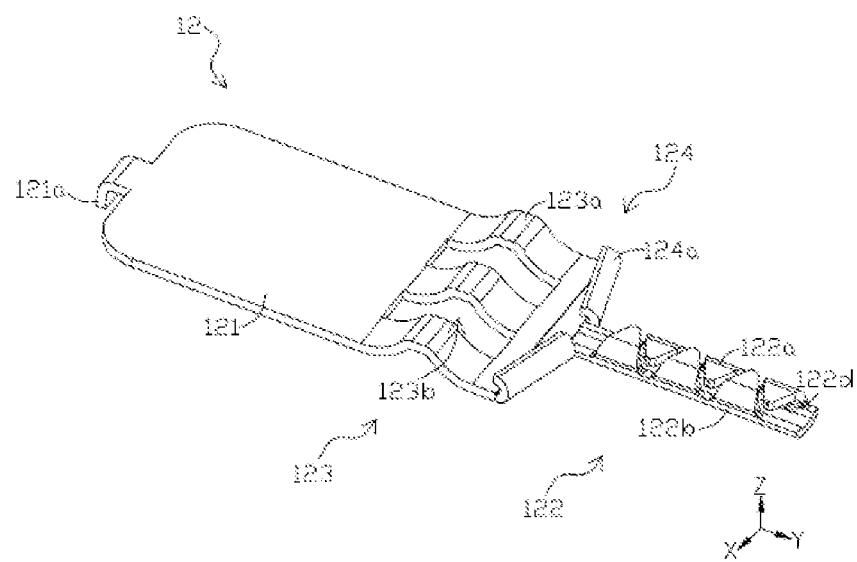
FIG. 11 is a schematic structural diagram of a connecting part provided in this application according to a second specific embodiment, where the first connecting section is in an initial state.

Specifically, as shown in FIG. 9 to FIG. 11, a second through-hole 112c is opened on the signal collecting portion 112. The first connecting section 122a of the connecting portion 122 can penetrate the second through-hole 112c, so that at least a part of the signal collecting portion 112 is located between the first connecting section 122a and the second connecting section 122b. In this embodiment, after the first connecting section 122a passes through the second through-hole 112c, it is convenient to implement the connection between the connecting portion 122 and the signal collecting portion 112.

In this embodiment, the second through-hole 112c is disposed on the signal collecting portion 112 to facilitate connection between the connecting portion 122 and the signal collecting portion 112, increase integrity of the signal collecting portion 112, and reduce risks of deformation and fracture of the signal collecting portion 112.

In some embodiments, as shown in FIG. 9, a first through-hole 111c is opened on the insulation film 111. In the thickness direction Z of the sampling component 1, at least a part of the connecting portion 122 passes through the first through-hole 111c and is connected to the signal collecting portion 112.

In this embodiment, as shown in FIG. 9, the connecting part 12 and the insulation film 111 are arranged along the thickness direction Z. Through the first through-hole 111c opened on the insulation film 111, the connecting portion 122 of the connecting part 12 can pass through the first through-hole 111c along the thickness direction Z, and extends into the sampling component 1 to get electrically connected to the signal collecting portion 112. That is, the first through-hole 111c disposed facilitates signal collection.

In the embodiment shown in FIG. 11, after passing through the second through-hole 112c, the first connecting section 122a extending in the thickness direction Z can bend against the signal collecting portion 112. After the bending, along the thickness direction Z, the first connecting section 122a abuts against the signal collecting portion 112, and/or, the second connecting section 122b abuts against the signal collecting portion 112. More specifically, as shown in FIG. 9, two second through-holes 112c may be opened on the signal collecting portion 112, and the two second through-holes 112c are spaced out. The connecting portion 122 may include two first connecting sections 122a that are spaced out. The two first connecting sections 122a can pass through the two second through-holes 112c respectively, and bend against the signal collecting portion 112. The two first connecting sections 122a are bent toward each other. The two first connecting sections 122a and the second connecting section 122b form an encircling structure shown in FIG. 11, and define an accommodation cavity 122d. The signal collecting portion 112 between the two second through-holes 112c is located in the accommodation cavity 122d. In this embodiment, a connection area between the connecting part 12 and the signal collecting portion 112 of this structure is relatively large, thereby improving reliability of the connection between the connecting part and the signal collecting portion and improving stability of signal collection.

Figure 8:
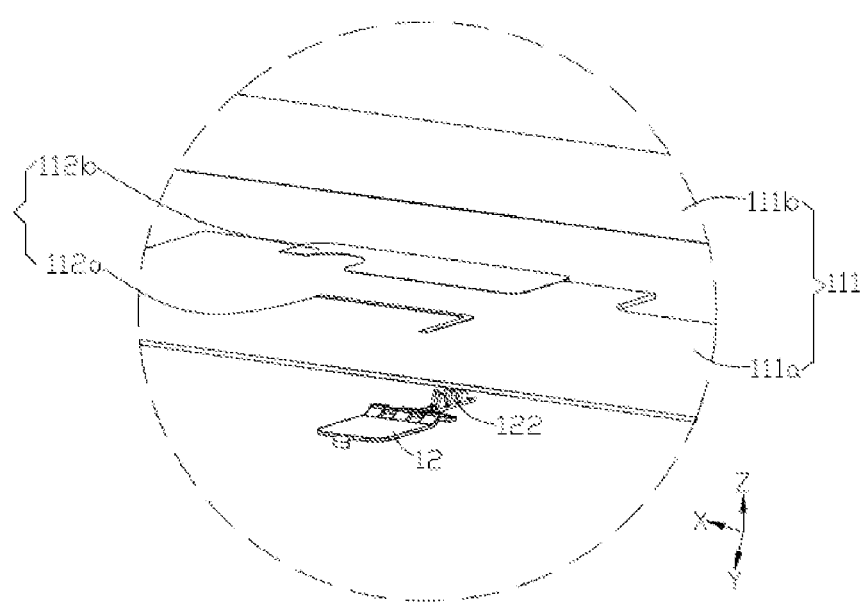
FIG. 8 is a local detailed view of part II shown in FIG. 7, where a signal collecting portion is based on a first embodiment.

In another embodiment, as shown in FIG. 8, the signal collecting portion 112 may contain no second through-hole. The signal collecting portion 112 may include a conductive plate 112b and a sampling wire 112a. The sampling wire 112a is configured to collect a signal of the battery cell 5. The conductive plate 112b is electrically connected to the sampling wire 112a. The sampling wire 112a is located on a side of the conductive plate 112b, the side being close to the connecting part 12. Therefore, at least a part of the sampling wire 112a can be located in the accommodation cavity 122d, thereby implementing connection between the connecting part 12 and the sampling wire 112a.

In this embodiment, the sampling wire 112a disposed in the signal collecting portion 112 facilitates connection between the signal collecting portion 112 and the connecting part 12, and improves reliability of the connection.

Figure 12:
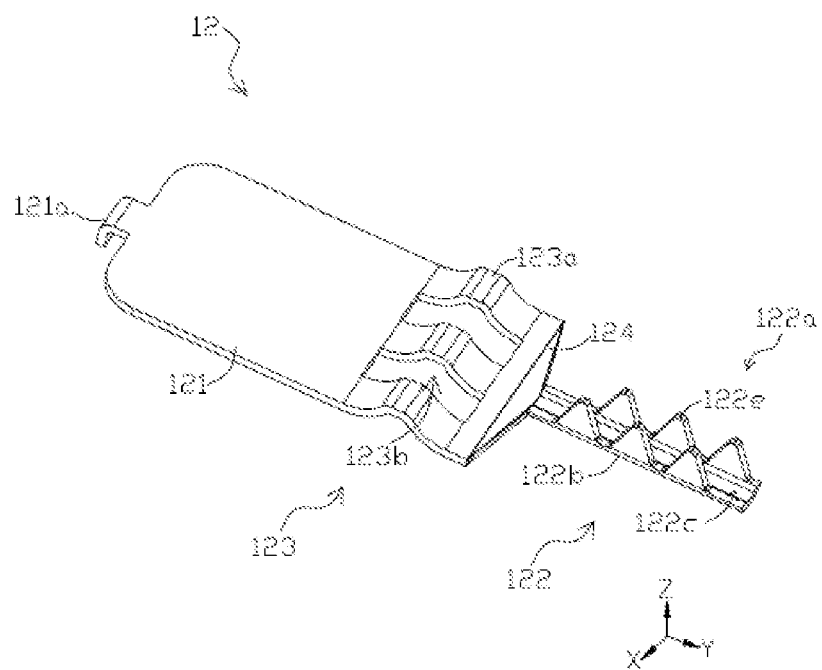
FIG. 12 is a schematic structural diagram of a connecting part provided in this application according to a third specific embodiment, where the first connecting section is in a connected state.

In another embodiment, as shown in FIG. 12, in the connecting portion 122 of the connecting part 12, the first connecting section 122a includes a plurality of tips 122e. A cross-sectional area of each tip 122e gradually decreases in a direction toward the circuit board 11. When the connecting part 12 is connected to the circuit board 11, as shown in FIG. 5, the tip 122e can pierce the insulation film 111 of the circuit board 11, and can bend against the second connecting section 122b, as shown in FIG. 6. In this way, at least a part of the signal collecting portion 112 is located between the first connecting section 122a and the second connecting section 122b.

In this embodiment, the first through-hole does not need to be disposed on the insulation film 111 of the circuit board 11 beforehand, but the tip 122e of the connecting part 12 just pierces the insulation film 111 when the connecting part 12 is connected to the circuit board 11. Therefore, the connection position between the connecting part 12 and the circuit board 11 is not limited by the position of the first through-hole, thereby improving flexibility of connection between the connecting part 12 and the circuit board 11.

In this embodiment, a second through-hole 112c may be disposed in the signal collecting portion 112. After piercing the insulation film 111, the tip 122e can pass through the second through-hole 112c to get connected to the signal collecting portion 112. Alternatively, as shown in FIG. 8, the signal collecting portion 112 may contain no second through-hole. In this case, the signal collecting portion 112 may include a conductive plate 112b and a sampling wire 112a. The sampling wire 112a is configured to collect a signal of the battery cell 5. The conductive plate 112b is electrically connected to the sampling wire 112a. The sampling wire 112a is located on a side of the conductive plate 112b, the side being close to the connecting part 12. Therefore, after piercing the insulation film 111, the tip 122e can be connected to the sampling wire 112a. To be specific, at least a part of the sampling wire 112a can be located between the tip 122e and the second connecting section 112b so that the sampling wire 112a is connected to the tip 122e.

In this embodiment, as shown in FIG. 12, a guide trough 122c is disposed on the second connecting section 122b of the connecting part 12. The connecting portion 122 of the connecting part 12 may include a plurality of tips 122e, and include two rows of tips 122e that are parallel to each other. Each row of tips 122e includes a plurality of tips 122e spaced out. The two rows of tips 122e can bend toward each other. After the bending, a preset space exists between the tips 122e and a bottom wall of the guide trough 122c. The preset space is configured to accommodate the signal collecting portion 112 (for example, the sampling wire 112a) between the first connecting section 122a and the second connecting section 122b.

In some embodiments, as shown in FIG. 10 to FIG. 12, the connecting part 12 further includes a buffer portion 123. The buffer portion 123 is located between the connecting portion 122 and the body portion 121, and is connected to both of them. The buffer portion 123 can deform when receiving a force. For example, as shown in FIG. 5, the connecting portion 122 and the body portion 121 are arranged along the width direction Y of the battery module M2. Therefore, the buffer portion 123 can deform along the width direction Y. When the battery module M2 vibrates during operation, the deformation of the buffer portion 123 can cushion an impact load received by the connecting part 12. In addition, when the battery module M2 expands during operation, the connecting part 12 receives an expansion force. In this case, the deformation of the buffer portion 123 can cushion the expansion force received by the connecting part 12, thereby reducing risks of disconnection between the connecting part 12 and the circuit board 11.

Specifically, as shown in FIG. 10 to FIG. 12, the buffer portion 123 may include a plurality of bend structures 123a. The bend structures 123a protrude in a height direction Z (the thickness direction Z of the sampling component 1). Therefore, when a force received by the connecting part 12 leads to a tendency of moving far away from each other between the connecting portion 122 and the body portion 121, the bend structure 123a can deform, thereby compensating for the deformation of the connecting portion 122 and the body portion 121, and preventing decrease of reliability of connection between the connecting part 12 and the circuit board 11 caused by the pulling between the connecting portion 122 and the body portion 121.

More specifically, as shown in FIG. 10 to FIG. 12, a gap 123b exists between adjacent bend structures 123a. The gap 123b makes the bend structures 123a be spaced apart from each other so that the buffer portion 123 is easily deformable, thereby improving the reliability of connection between the connecting part 12 and the circuit board 11. In addition, the gap 123b between the adjacent bend structures 123a can reduce a weight of the connecting part 12, thereby increasing an energy density of the battery module M2.

In some embodiments, as shown in FIG. 10 to FIG. 12, the connecting part 12 may further include a transition portion 124. The transition portion 124 is located between the connecting portion 122 and the buffer portion 123, and is connected to both of them. Specifically, the transition portion 124 may be a tapered structure. In a direction from the buffer portion 123 to the connecting portion 122, a cross-sectional area of the transition portion 124 gradually decreases, so that two ends of the transition portion 124 can fit with both the buffer portion 123 and the connecting portion 122.

More specifically, as shown in FIG. 11, a reinforcing structure 124a may be disposed on the transition portion 124. The reinforcing structure 124a can be used to increase strength of the connecting portion 122 and the transition portion 124, reduce risks of deformation of the connecting portion 122, and thereby improve the reliability of connection between the connecting portion 122 and the circuit board 11. The reinforcing structure 124a may be arc-shaped. The reinforcing structure 124a of the arc-shaped structure can reduce concentration of stress, and thereby increase the strength and rigidity of the connecting part 12.

In another embodiment, as shown in FIG. 10 to FIG. 12, a limiting structure 121a is disposed on the body portion 121 of the connecting part 12. Specifically, the limiting structure 121a may be a sheet-like structure extending downward, Correspondingly, as shown in FIG. 5 and FIG. 6, a limiting hole 21 is opened on the connecting plate 2 of the battery module M2. At least a part of the limiting structure 121a can extend into the limiting hole 21 and fit with the limiting hole 21.

In the above embodiments, as shown in FIG. 6, in the battery module M2, along the height direction Z, the connecting part 12 is located between the connecting plate 2 and the sampling component 1, and the connecting part 12 is connected to the circuit board 11 (mechanically and electrically). In addition, the connecting part 12 is connected to the connecting plate 2, and specifically, may be connected by welding. In this way, electrical connection is implemented between the connecting plate 2 and the circuit board 11, and the circuit board 11 can collect information about each battery cell 5 through the connecting plate 2.

Specifically, through coordination between the limiting structure 121a and the limiting hole 21, relative movement between the connecting part 12 and the connecting plate 2 is restricted before welding the connecting part 12 to the connecting plate 2, thereby improving reliability of the welding between them.

In the above embodiments, the connecting part 12 may be made of a material of a copper-nickel alloy (cupronickel). The copper-nickel alloy is a copper-based alloy in which nickel is a main additive element, where the content of nickel may be adjusted according to actual needs. When the connecting part 12 is made of a material of a copper-nickel alloy, the connecting part 12 is of relatively high ductility and strength, thereby facilitating crimping, improving the reliability of the connection between the connecting part 12 and the signal collecting portion 112, and enabling welding of the connecting part 12 to the connecting plate 2 (the connecting plate 2 may be made of an aluminum material).

Therefore, in this embodiment, the reliability of connection is relatively high between the connecting part 12 and the connecting plate 2, and between the connecting part and the signal collecting portion 112.

The foregoing descriptions are merely exemplary embodiments of this application, but are not intended to limit this application. A person skilled in the art understands that this application may have various modifications and variations. Any modification, equivalent replacement, improvement, and the like made without departing from the spirit and principles of this application fall within the protection scope of this application.

What is claimed is:

1. A sampling component, comprising:
   a circuit board, wherein the circuit board comprises a signal collecting portion and an insulation film connected to the signal collecting portion; and
   a connecting part, wherein the connecting part comprises a body portion and a connecting portion, the body portion is connected to the connecting portion, and the connecting portion is electrically connected to the signal collecting portion;
   wherein, the signal collecting portion of the circuit board is not electrically connected with the connecting portion of the connecting part by welding,
   in a height direction, the connecting portion comprises a first connecting section and a second connecting section, and the first connecting section is connected to the second connecting section;
   in the height direction, at least a part of the signal collecting portion is located between the first connecting section and the second connecting section; and
   wherein the connecting part further comprises a buffer portion, and the buffer portion is connected to the connecting portion and the body portion, and the buffer portion comprises a plurality of bend structures, and each of the plurality of bend structures protrudes in the height direction.

2. The sampling component according to claim 1, wherein a second through-hole is opened on the signal collecting part, and the first connecting section is configured to pass through the second through-hole, so that at least a part of the signal collecting part is located between the first connecting section and the second connecting section.

3. The sampling component according to claim 2, wherein a first through-hole is opened on the insulation film, and at least a part of the connecting portion is configured to pass through the first through-hole and is connected to the signal collecting portion.

4. The sampling component according to claim 1, wherein the first connecting section comprises a plurality of tips; and, in a direction toward the circuit board, a cross-sectional area of each of the plurality of tips gradually decreases; and
each of the plurality of tips is configured to pierce the insulation film, and is configured to bend against the second connecting section, so that at least a part of the signal collecting portion is located between the first connecting section and the second connecting section.

5. The sampling component according to claim 1, wherein a gap exists between adjacent bend structures.

6. The sampling component according to claim 1, wherein the connecting part further comprises a transition portion, the body portion is connected to the buffer portion, and the transition portion is connected between the buffer portion and the connecting portion.

7. The sampling component according to claim 6, wherein a reinforcing structure is disposed on the transition portion, and the reinforcing structure is arc-shaped.

8. The sampling component according to claim 1, wherein a material of the connecting part comprises a copper-nickel alloy.

9. A battery module, comprising:
a battery cell, wherein the battery cell comprises an electrode lead;
a connecting plate, wherein the connecting plate is connected to the electrode lead of the battery cell; and
a sampling component, wherein the sampling component is connected to the connecting plate by a connecting part, and the sampling component comprises:
a circuit board, wherein the circuit board comprises a signal collecting portion and an insulation film connected to the signal collecting portion; and
a connecting part, wherein the connecting part comprises a body portion and a connecting portion, the body portion is connected to the connecting portion, and the connecting portion is electrically connected to the signal collecting portion;
wherein, the signal collecting portion of the circuit board is not electrically connected with the connecting portion of the connecting part by welding,
in a height direction, the connecting portion comprises a first connecting section and a second connecting section, and the first connecting section is connected to the second connecting section;
in the height direction, at least a part of the signal collecting portion is located between the first connecting section and the second connecting section; and
wherein the connecting part further comprises a buffer portion, and the buffer portion is connected to the connecting portion and the body portion, and the buffer portion comprises a plurality of bend structures, and each of the plurality of bend structures protrudes in the height direction.

10. The battery module according to claim 9, wherein a limiting structure is disposed on the body portion; and
a limiting hole is opened on the connecting plate, and the limiting structure fits with the limiting hole.

11. A battery pack, comprising:
a box body, wherein the box body comprises an accommodation cavity; and
a battery module, wherein the battery module is accommodated in the accommodation cavity, and the battery module comprises:
a battery cell, wherein the battery cell comprises an electrode lead;
a connecting plate, wherein the connecting plate is connected to the electrode lead of the battery cell; and
a sampling component, wherein the sampling component is connected to the connecting plate by a connecting part, and the sampling component comprises:
a circuit board, wherein the circuit board comprises a signal collecting portion and an insulation film connected to the signal collecting portion; and
a connecting part, wherein the connecting part comprises a body portion and a connecting portion, the body portion is connected to the connecting portion, and the connecting portion is electrically connected to the signal collecting portion;
wherein, the signal collecting portion of the circuit board is not electrically connected with the connecting portion of the connecting part by welding,
in a height direction, the connecting portion comprises a first connecting section and a second connecting section, and the first connecting section is connected to the second connecting section;
in the height direction, at least a part of the signal collecting portion is located between the first connecting section and the second connecting section; and
wherein the connecting part further comprises a buffer portion, and the buffer portion is connected to the connecting portion and the body portion, and the buffer portion comprises a plurality of bend structures, and each of the plurality of bend structures protrudes in the height direction.

12. The battery module according to claim 9, wherein a second through-hole is opened on the signal collecting part, and the first connecting section is configured to pass through the second through-hole, so that at least a part of the signal collecting part is located between the first connecting section and the second connecting section.

13. The battery module according to claim 12, wherein a first through-hole is opened on the insulation film, and at least a part of the connecting portion is configured to pass through the first through-hole and is connected to the signal collecting portion.

14. The battery module according to claim 9, wherein the first connecting section comprises a plurality of tips; and, in a direction toward the circuit board, a cross-sectional area of each of the plurality of tips gradually decreases; and
each of the plurality of tips is configured to pierce the insulation film, and is configured to bend against the second connecting section, so that at least a part of the signal collecting portion is located between the first connecting section and the second connecting section.

15. The battery pack according to claim 11, wherein a second through-hole is opened on the signal collecting part, and the first connecting section is configured to pass through the second through-hole, so that at least a part of the signal collecting part is located between the first connecting section and the second connecting section.

16. The battery pack according to claim 15, wherein a first through-hole is opened on the insulation film, and at least a part of the connecting portion is configured to pass through the first through-hole and is connected to the signal collecting portion.

17. The battery pack according to claim 11, wherein the first connecting section comprises a plurality of tips; and, in a direction toward the circuit board, a cross-sectional area of each of the plurality of tips gradually decreases; and each of the plurality of tips is configured to pierce the insulation film, and is configured to bend against the second connecting section, so that at least a part of the signal collecting portion is located between the first connecting section and the second connecting section.

18. The battery module according to claim 9, wherein a gap exists between adjacent bend structures.

19. The battery module according to claim 9, wherein the connecting part further comprises a transition portion, the body portion is connected to the buffer portion, and the transition portion is connected between the buffer portion and the connecting portion.

20. The battery module according to claim 9, wherein a reinforcing structure is disposed on the transition portion, and the reinforcing structure is arc-shaped.

21. The battery module according to claim 9, wherein a material of the connecting part comprises a copper-nickel alloy.

\* \* \* \* \*